Fig. 1

INVENTOR.
WILLIAM H. JORGENSEN
BY
Wheeler, Wheeler & Wheeler
ATTORNEYS

June 29, 1965  W. H. JORGENSEN  3,191,260
MACHINE TOOL TURRET HAVING MULTIPLE TOOLS
Filed July 27, 1961  6 Sheets-Sheet 3

INVENTOR.
WILLIAM H. JORGENSEN
BY
Wheeler, Wheeler & Wheeler
ATTORNEYS

June 29, 1965  W. H. JORGENSEN  3,191,260
MACHINE TOOL TURRET HAVING MULTIPLE TOOLS
Filed July 27, 1961  6 Sheets-Sheet 5

Fig. 15

INVENTOR.
WILLIAM H. JORGENSEN
BY
Wheeler, Wheeler + Wheeler
ATTORNEYS

United States Patent Office 3,191,260
Patented June 29, 1965

3,191,260
MACHINE TOOL TURRET HAVING
MULTIPLE TOOLS
William H. Jorgensen, 201 Jacobs, Green Bay, Wis.
Filed July 27, 1961, Ser. No. 127,264
15 Claims. (Cl. 29—26)

This invention relates to a machine tool turret having multiple tools, each tool being stored in its own chuck and in its own pocket of a turret rotatable to make each tool selectively registrable with a driving spindle.

While the machine may be manually controlled, it is particularly designed for automatic programming pursuant to a schedule prearranged on tape or the like. Changes can be preselected according to a core set up on the tape. At the proper time, the turret will index to bring the appropriate tool into registry with a driving spindle. The turret thereupon becomes locked and the spindle advances and automatically clutches the tool chuck and continues down through the turret pocket with the chuck at such traverse or cutting speeds as are appropriate at different levels of work engagement. When the work of a particular tool has been completed, the spindle will automatically retract and, having restored the chuck to the pocket of the turret, the spindle will release the chuck and clear the turret for further indexing movement.

The indexing can be initiated in either direction subject to the control of the programming tape. The indexing motion will initially be at relatively high speed until the approximate indexed position of the turret is reached. Thereupon the turret will stop, possibly with slight overrun, and, regardless of its previous direction of rotation, it will then reverse at low speed to stop at the precise selected position.

The turret control mechanism includes cams cut for binary resolution of the programming sequence set up for operation by appropriate relays. As the turret approaches the vicinity of the desired position, the selected relay operates to arrest turret movement. If there is overrun, such as normally occurs, the turret drive is automatically reversed and operates at low speed to return to the precise desired position of registration.

The machine tool is primarily designed for such operations as drilling, boring and reaming but it may also be used for all milling operations.

Figure 1:
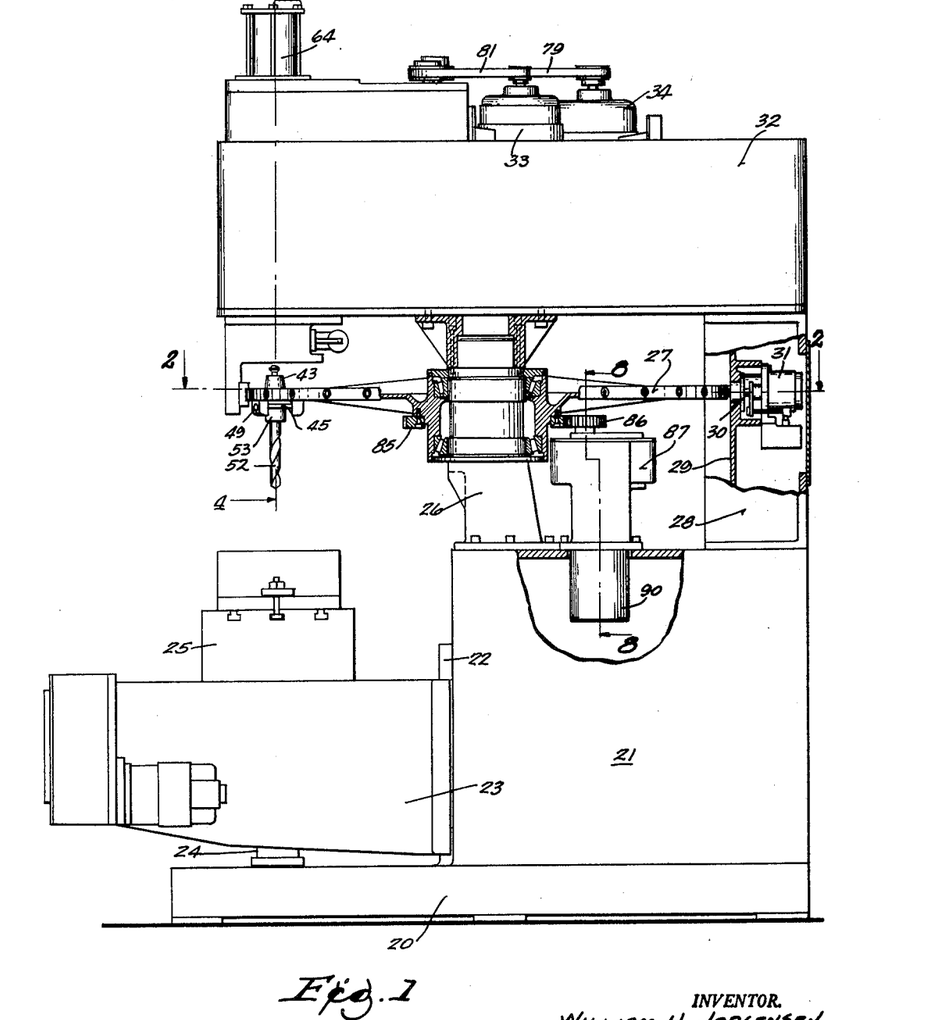
FIG. 1 is a view in side elevation of a machine tool embodying the invention, portions being broken away.

The machine tool comprises a base 20 supporting a frame 21 of any appropriate design, which is provided with ways 22 for the knee 23. On the knee there is a saddle 24 mounted for movement from front to rear. On the saddle, a way is provided for the transverse movement of the usual table 25.

The frame 21 includes a multiple column structure including a forward column 26 upon which bearings are provided for the rotatable turret 27 hereinafter described as a convenient carriage for moving a selected tool transversely respecting the axis of a spindle to which such tool may selectively be clutched. At the rear of the machine is another column element 28 which has a concave face 29 to receive the periphery of turret 27.

Within column element 28 is mounted a dowel 30 and its operating ram 31 for locking and releasing the turret 27.

The two turret elements 26 and 28 support a head 32 which carries a motor 33 for the advance and retraction of the spindle as hereinafter described, and a motor 34 which drives the spindle through the usual transmission for controlling its speed of rotation.

Figures 4, 5, 6, 7:
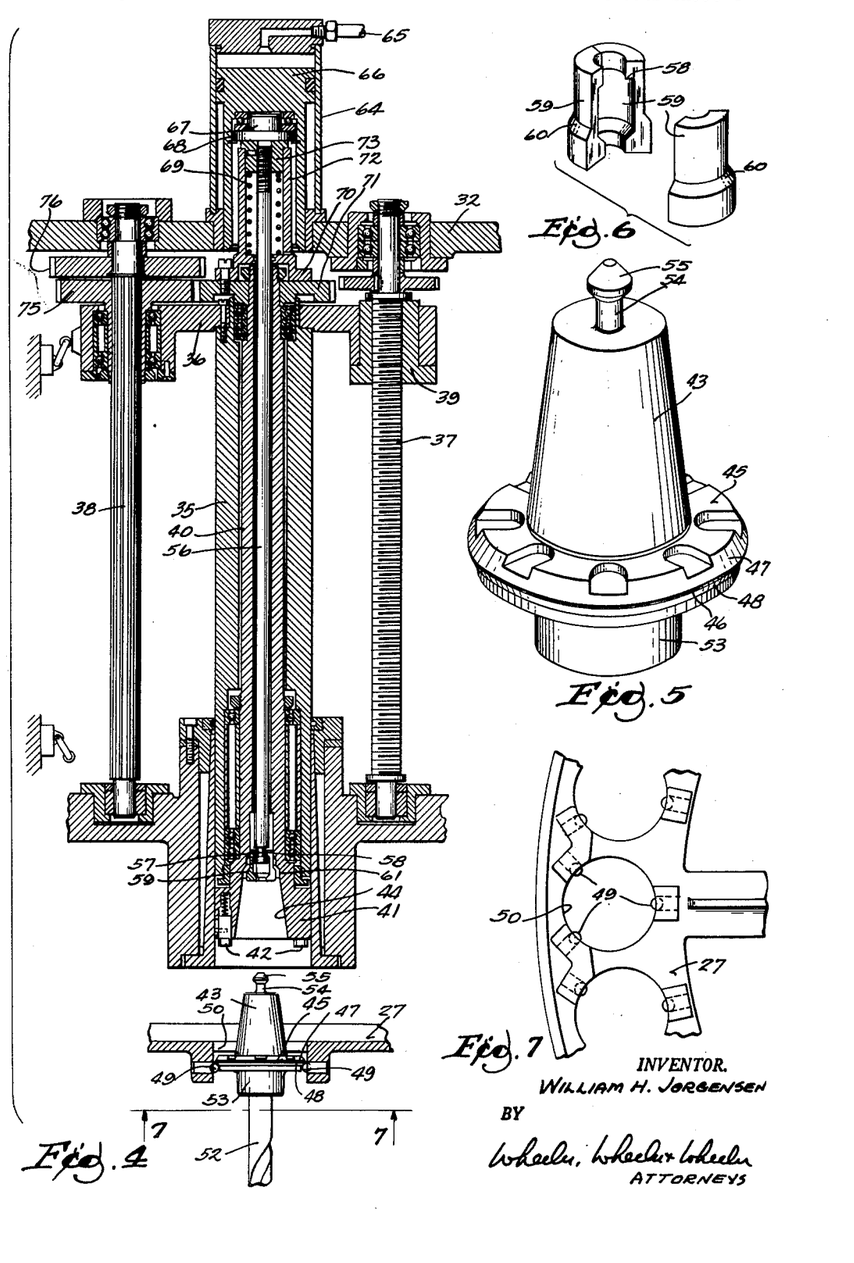
FIG. 4 is a view taken in section on a further enlarged scale on the line 4—4 of FIG. 1.
FIG. 5 is an enlarged detail view in perspective of one of the tool chuck clutches which mounts the tools in the indexing turret.
FIG. 6 is a fragmentary detail view in perspective showing the disassociated component parts of a clutch for coupling the chuck of FIG. 5 to the spindle shown in FIG. 4.
FIG. 7 is a fragmentary inverted plan view taken from the viewpoint indicated at 7—7 of FIG. 4.

FIG. 4 shows a cross section through the head on the spindle axis. Quill 35 is carried by a cross head 36 vertically reciprocable along a threaded feed screw 37 and a spindle drive shaft 38. The feed nut 39 on screw 37 controls the advance and retraction of the quill.

Tubular spindle 40 is rotatable on a fixed axis in bearings provided in the quill. At the lower end of the spindle is an annular clutch jaw 41 from which the yieldably mounted pins 42 normally project axially for driving engagement with the tool carrier. The carrier is here generically designated by reference character 45 and is separately illustrated in FIG. 5.

Turret mounting of tool chucks

Each tool chuck or carrier has a tapered upper extremity 43 receivable into a complementary socket 44 of the clutch member 41. A peripheral flange 46 on the tool chuck 45 has outwardly converging beveled surfaces 47 and 48 for engaging springpressed detent balls 49 mounted in the respective turret pocket 50 (FIGS. 4 and 7). The actual chuck mechanism which holds the tool 52 in the hub portion 53 of chuck 45 is not illustrated and may be of any desired construction.

Clutching tool chucks to spindle

Figure 15:
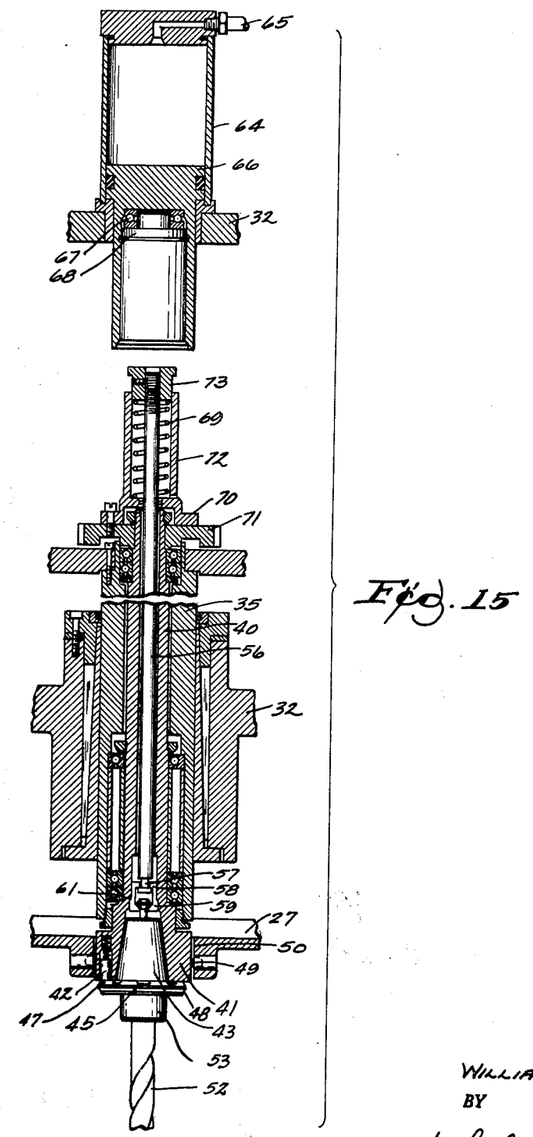
FIG. 15 is a view similar to FIG. 4 showing the parts in the relative positions of use.

For detachably securing to the spindle the chuck structure 45 and the tool mounted therein, the chuck member 45 is provided at its end with a central stud 54 and knob 55. Reciprocable in the tubular spindle 40 is a control rod 56 having near its lower end an annular groove 57 with which are loosely engaged the arcuate flanges 58 of each of a plurality of retaining dogs 59 separately illustrated in FIG. 6. Externally, these dogs are beveled at 60 and the clutching terminal portion 41 of spindle 40 has a complementarily beveled counterbore at 61. In the position in which the control rod 56 is illustrated in FIG. 4, the dogs 59 are loose and are readily engaged with, or disengaged from, the knob 55 of stud 54 upon the occurrence of relative axial movement between the spindle and the chuck 45. However, if the control rod 56 is retracted upwardly within the tubular spindle, the cam surfaces 60 of dog 59 engage the complementary surfaces 61 of the spindle counterbore thereby locking the dogs about the knob 55 to hold the chuck 45 with its tapered portion 43 securely engaged in complementary socket 44 of the spindle as shown in FIG. 15 and hereafter described.

The relative axial movement of the control rod 56 is effected by opposing spring and fluid pressure as follows:

At the top of the head 32 is a cylinder 64 supplied with constant fluid pressure through pipe 65 to exert downward thrust on piston 66 within the cylinder. The anti-friction bearing 67 is engaged with a disk 68 at the upper end of control rod 56. This is subject to the upward thrust of the compression spring 69 having a seat 70 mounted on the spindle driving gear 71. Spring seat plunger 73 is threaded to the upper end of control rod 56 and reciprocates in a tubular extension 72 of spring seat thereby enclosing spring 69.

In the position of the parts illustrated in FIG. 4, plunger 73 is engaged with disk 68, thereby subjecting the control rod to the pressure of fluid in cylinder 64 and compressing spring 69 to move the control rod relatively downwardly within the spindle. When the spindle is advanced downwardly by the movement of the quill 35, pursuant to the action of feed screw 37 on nut 39 and cross head 36, the fluid pressure on piston 66 will cause the piston to follow and to maintain pressure on spring seat plunger 73 to keep spring 69 compressed and dogs 59 loose until the continued advance of the quill engages the dogs over the knob 55 of the chuck stud 54.

When the clutch jaw 41 is engaged with the chuck as shown in FIG. 15, the piston 66 reaches the end of cylinder 64 and stops. In the continued downward advance of the quill, the spring 69 expands to retract the control rod 56 and to clamp the jaws 59 upon the knob 55 of stud 54 at the upper end of chuck 45. This tightly clutches the chuck to the spindle so that the chuck and tool are securely fixed to the spindle during continued advance of the spindle with the quill as above described. FIG. 15 shows the parts in a position in which the advance of chuck 45 has cammed its beveled surface 48 past the detent balls 49, thereby releasing the chuck from the pocket 50 of the turret. Clutch member 41 of tubular spindle 40 has already advanced through the pocket 50 of the turret and the quill and spindle may follow, subject to the control of the feed screw 37.

During such advance, the spindle 40 will normally be in continuous rotation. Its gear 71 remains in mesh with driving gear 75 rotatably mounted on cross head 36 and splined to the spindle drive shaft 38, which rotates on the fixed bearing in head 32. Keyed to the upper end of the drive shaft is driving gear 76 which has bearings fixed in the top of head 32 as shown in FIG. 4.

The speed control transmission 77, driven by motor 37 through belt 79, has an output gear 78 which is in mesh with gear 76 on spindle drive shaft 38. The spindle feed transmission 80 driven by motor 33 through belt 81 has an output gear 82 which is in mesh with outer gear 83 keyed to feed screw 37. Both the speed control transmission 77 and the spindle feed transmission 80 have controls for selectively varying the output speed.

After the tool has performed the desired operation on the work, the tool and chuck are restored to their storage positions in the turret. Subject to automatic or manual control, the rotation of the feed screw 37 is reversed, thereby causing the cross head 36 and quill 35 to move upwardly through the position of FIG. 15 toward that of FIG. 4. The chuck 45 will remain firmly clutched within the clutch head 41 of the spindle 40 until the beveled flange 47 of the chuck is engaged above the spring-pressed detent balls 49 as shown in FIG. 4. At this point, the spring seat 73 of rod retracting spring 69 will engage the thrust member 68 of piston 66. The fluid pressure to which piston 66 is continuously subject will override the bias of spring 69 so that continued upward movement of the quill will result in the control rod 56 being forced downwardly within the spindle to release the dogs 59 thereby disengaging the spindle clutch 41 from the complementary clutch surfaces of the tool chuck 45. While the fluid pressure to which piston 66 is subject is greater than the bias of spring 69, it is not sufficient to prevent continued upward movement of the quill and spindle to the position of FIG. 4, the chuck being left in its pocket 50 of turret 27.

Turret Indexing

Indexing rotation is imparted to the turret 27 through a gear 85 upon the turret. Meshing with the turret gear 85 is a driving pinion 86 at the output end of the speed reducing transmission gear train 87 shown in developed form in FIG. 8.

Figure 8:
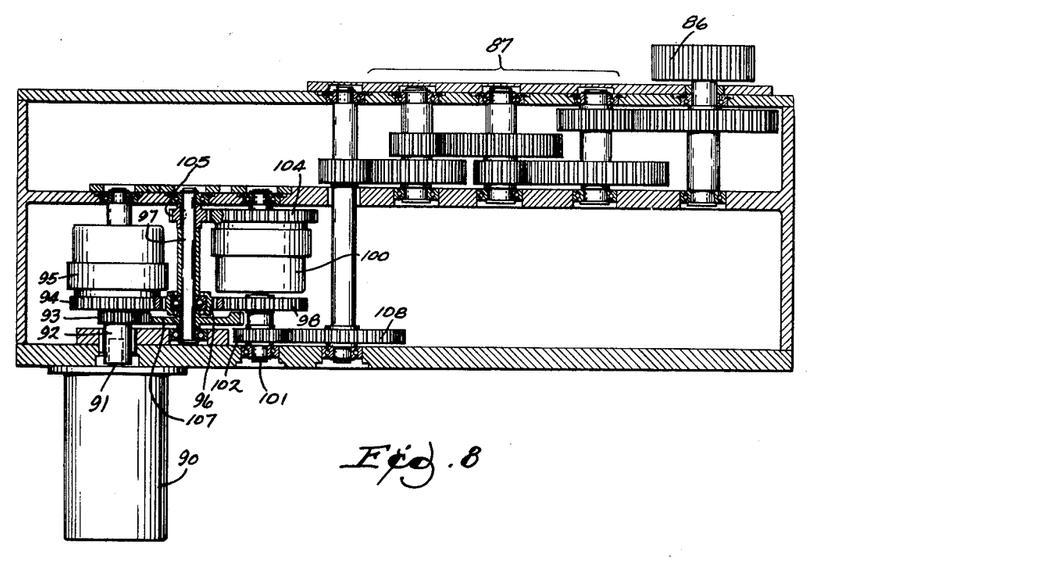
FIG. 8 is an enlarged detail view in section taken on the line 8—8 of FIG. 1.

Power is derived from the reversible turret operating motor 90. Its armature shaft 91 drives clutch shaft 92 with which pinion 93 is in permanent connection. The gear 94 may be selectively clutched to shaft 92 by means of an electromagnetic clutch 95. Meshing with gear 94 is an idler pinion 96 freely rotatable on jack shaft 97. The pinion 96 meshes with gear 98 which is keyed to shaft 101 upon which pinion 102 is fixed. Shaft 101 extends through electric clutch 100 and has at its upper end a gear 104 with which meshes a pinion 105 fixed to the jack shaft 97. The jack shaft is driven from pinion 93 by gear 107. Gear 104 is clutched to shaft 101 by electric clutch 100.

The two clutches 95 and 100 have electrical connections which work in alternation so that only one clutch may be energized at a time. With high speed clutch 95 energized as above described, the drive from motor 90 will be through shafts 91, 92 and gear 94, idler 96 and gear 98 to drive pinion 102. Pinion 102 meshes with the input gear 108 of the speed reducing gear train 87.

If the high speed clutch 95 is deenergized and low speed clutch 100 is energized, the gears 94, 96 and 98 will be idle and the drive will be from shaft 91 through pinion 93 to gear 107, and jack shaft 97 to pinion 105 and gear 104 and thence to shaft 101. It will be observed that the ratios of pinion 93 to gear 107 and pinion 105 to gear 104 are such as to effect very much reduced speed of turret operation when the drive is controlled by clutch 95. The arrangement is such that the reversible motor 90 will function in either desired direction and the drive through the gear train can be greatly reduced in speed regardless of the direction of operation of the motor.

Control of turret indexing

Also meshing with turret gear 85 is a gear 110 (FIGS. 2 and 9) which operates the turret control cams and switches and relays in proper sequence. Gear 110 is mounted on a shaft 111 which carries a relatively large gear 112 and a relatively small gear 113. The gear 113 meshes with gear 114 on the tubular cam shaft 115, driven, in practice, in the ratio of one to one with the turret. The gear 112 meshes with a small gear 116 which drives the proximity switch shaft 117 at a very much higher speed which, in practice, is fifteen times that of the cam shaft.

Figures 2, 9, 10, 11, 12, 13, 14:
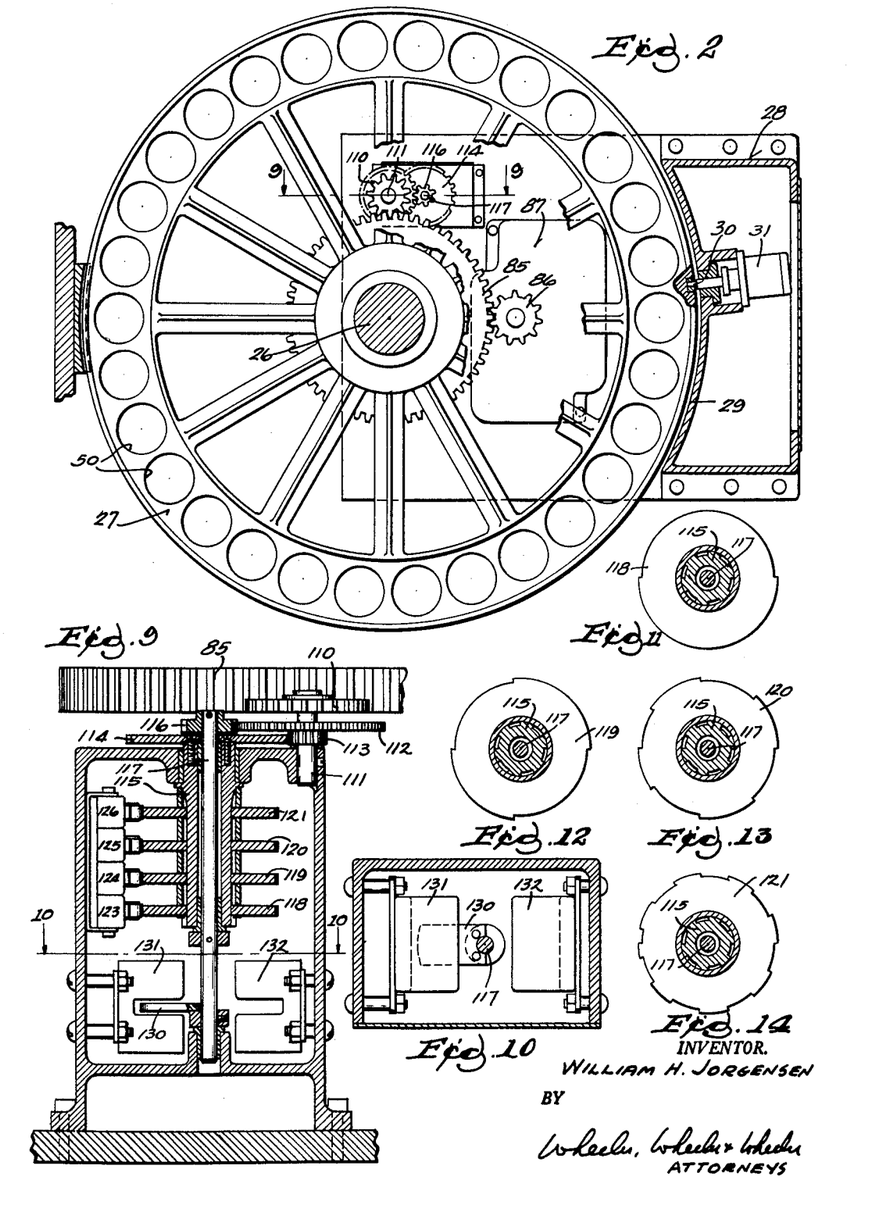
FIG. 2 is a view taken in horizontal section on an enlarged scale on the line 2—2 of FIG. 1.
FIG. 9 is an enlarged detail view in section taken on the line 9—9 of FIG. 2.
FIG. 10 is a view taken in section on line 10—10 of FIG. 9.
FIGS. 11 to 14 are plan views of the several cams shown in FIG. 9.
Figure 3:
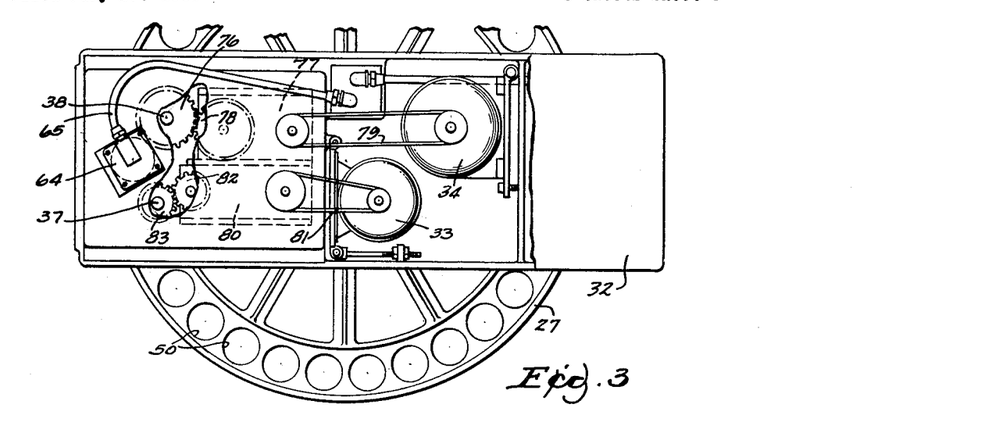
FIG. 3 is a fragmentary view on an enlarged scale taken in section on the line 3—3 of FIG. 1.

For controlling this machine, there is employed a tape-operated programming apparatus using a binary code. This apparatus is purchased as a unit and is not shown or claimed herein. Using this type of code, the numbers of the thirty tool pockets with which this particular turret is provided can all be achieved by various combinations with a unit control of the following cams which have even numbered response. On shaft 115, the cam 118 has two lobes (FIG. 11); the cam 119 has four lobes (FIG. 12); the cam 120 has eight lobes (FIG. 13); and cam 121 has sixteen lobes (FIG. 14). These cams respectively operate the actuators of switches 123 and 124, 125 and 126. The cam shaft 115 is so geared to the turret table as to make one rotation with each rotation of the turret.

Unit control is provided by the more rapidly moving proximity switch operating shaft 117, which carries the magnetic arm 130 (FIG. 9 and FIG. 10) which alternately energizes the magnetically responsive proximity switches 131 and 132 which are attached at diametrically opposite sides of the shaft 117. The timing is such that the odd numbered pockets of the turret pass beneath the selected tool station concurrently with the response of the proximity switch 131, while the even numbered pockets pass through the tool selecting station beneath the spindle coincidentally with the energization of proximity switch 132.

The tape-controlled programming apparatus is so designed that when the binary code is set up to identify the pockets by the numbers 1 through 30, the turret will solve the code by rotating clockwise as viewed in plan. When the apparatus is set up to identify the pockets by code numbers 41 through 70, the turret will solve the code by rotating counterclockwise. The difference in the number merely determines the direction of turret rotation. In other words, number 41 corresponds to pocket No. 1, etc. For each of the thirty pockets, the cam assembly has but one point of resolution.

An example will be given based on the assumption that pocket 25 contains the tool which it is desired to register at the operating station beneath the spindle. It will also be assumed that the programming is set up to resolve the code by rotation of the turret in a clockwise direction. The number "25", being the selected number of the pocket, is made up of the numbers "16" plus "8" plus "1." Accordingly, the turret will rotate until the relays have produced a number of impulses which will total to equal the number of the selected pocket, this being assumed to be "25."

Figure 16:
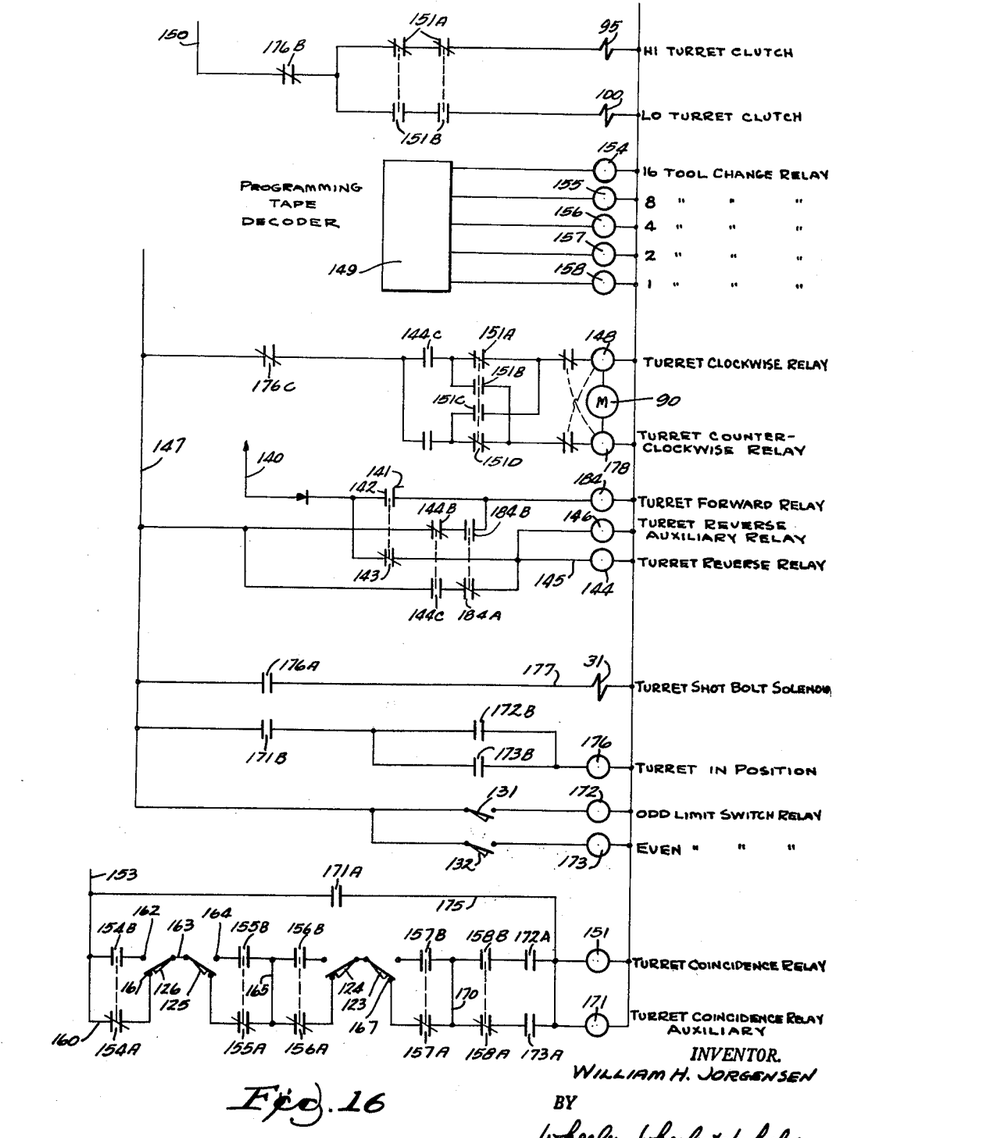
FIG. 16 is a simplified circuit diagram.

The spindle being fully retracted as shown in FIG. 4, the withdrawal of the shot bolt or dowel 30 will initiate the automatic indexing of the turret. Subject to the control of the stepping relay (not shown), which is a conventional part of commercial programming apparatus, the circuit 140 will be energized. The relay 141 has normally open contacts at 142 and normally closed contacts 143. If the relay 141 is energized by the programming apparatus to operate the turret counterclockwise, contacts 142 will be closed and contacts 143 opened. If the number program is "41" through "70," this occurs. However, in the present example, the number program is the number "25." Hence relay 141 is deenergized and the relay 144 is therefore energized through conductor 145 from contacts 143.

The contacts 144C of relay 144 will close a circuit from the supply line 147 to the contactor relay 148 which energizes the motor 90 to rotate the turret in a clockwise direction. The operation will be at high speed because the clutch 95 is energized from the supply line 150 through the normally closed contacts 151A of turret coincidence relay 151.

The turret coincidence relay is energized from current supply line 153 through a series of switches controlled by the programming tape decoder 149 to define the particular tool pocket to be brought into registry with the spindle. These switches comprise the contacts of relays 154, 155, 156, 157 and 158. Relay 154 has normally closed switch contacts at 154A and normally open contacts at 154B. Relay 155 has its normally closed contacts at 155A and normally open contacts at 155B. Relay 156 has its normally closed contacts 156A and normally open contacts at 156B. Relay 157 has normally closed contacts at 157A and normally open contacts at 157B. Relay 158 has normally closed contacts at 158A and normally open contacts at 158B.

Also included in the circuit with these various cam-operated relay contacts are the contacts 131A of proximity switch 131 and the contacts 132A of proximity switch 132. However, the arm 130 which brings about the response of proximity switch relays 131 and 132 operate so rapidly that the normally open contacts of these relays close intermittently. In practice these contacts close fifteen times during the angular movement of the turret between successive pockets.

In the selected example, in which pocket No. 25 is to be registered with the spindle, relays 154, 155 and 158 are energized. The contacts 154A, 155A and 158A will respectively be open and the contacts 154B, 155B and 158B will respectively be closed. Contacts 156A and 157A will remain closed while contacts 156B and 157B will remain open.

In consequence of this arrangement, there will be open circuits until the respective contacts 126 and 125 and 123 are engaged by the cams 121, 120 and 118 respectively. When the turntable position is such that cam 121 throws contactor 126 from engagement with contact 161 to engagement with contact 162, the circuit will be closed as far as conductor 163. Similarly when the turrent position is such that the cam 120 moves contactor 125 into engagement with contact 164, the circuit will be closed through switch 155B to the bridge conductor 165. Since relay 156 is deenergized, the contacts 156B will remain open and the circuit must now be completed through the bridge conductor and the closed contacts 156A to the closed contact 124 which, obviously, will remain closed since it has not been engaged by the lobe of cam 19. Similarly, since relay 157 is deenergized, the circuit through contact 123 to fixed contact 167 will be complete only if contact 123 is not engaged by cam 118 on shaft 117.

In the assumed condition of the parts, the circuit is potentially completed to the bridge conductor 170. According to whether relay 158 is energized or deenergized, the circuit will be completed from this point either through contacts 158A or 158B.

Under these conditions, therefore, the energization of the turrent coincidence relay 151 and the auxiliary turret coincidence relay 171 depends only upon the closing of the odd limit switch relay 172 or the even limit switch relay 173. If either is operated by the action of the arm 130 on the proximity switch 131 or 132, the appropriate relay 172 or 173 will operate to close the contacts 172A or 173A to energize relay 151 and 171.

At this point, the turret is in the precise desired position. However, it is also in high speed operation and therefore will overrun the selected point slightly. As it passes the point at which the turrent coincidence relays 151 and 171 are energized, the turrent motor 90 will be reversed, the high speed turrent clutch 95 will be disengaged and the low speed turret clutch 100 will be engaged. As a result, the turret will move slowly back to the selected position and this time it will stop and be locked in that position and control will be turned over to the spindle for advance to pick up and advance the selected tool and engage it with the work as above described.

The turret coincidence relay 151 has contacts 151A and 151B in the circuit leading to the high speed and low speed turret clutches 95 and 100. These bring about the shift from high speed turret drive to low speed turret drive as above described.

The auxiliary relay 171 has contacts at 171A and other contacts at 171B. The contacts 171 close a circuit 175 which bypasses all of the cam controlled switches, amounting to a holding circuit.

The contacts 171B are in series with the parallel connected contacts 172B and 173B of relays 172 and 173 respectively. These normally open contacts close with the operation of either proximity switch to present energization of a relay 176 which has contacts 176A in the circuit 177 which energizes the turret shotbolt solenoid 31 for advancing the shot bolt or dowel 30 to lock the turret. The relay 176 also has normally closed contacts at 176B which are opened when this relay is energized, thus deenergizing the clutches 95 and 100. A third set of contacts at 176C is opened when relay 176 is energized, thus disconnecting all power from the motor 90. The main turret coincidence relay 151 also has a series of contacts 151A, 151B, 151C and 151D in the circuit leading to the turret clockwise contactor 148 and to the turret counterclockwise contactor 178, these being the contacts which bring about the motor reversal when the turret overruns the selected position in the manner which normally occurs during its high speed operation.

In other words, regardless of which direction the turret is moving at high speed, the arrangement is such that when it overruns the selected position, the deenergization of its motor will be merely momentary and the motor will be reenergized after the selected position has been overrun but the contacts of relay 151 will have reversed the direction of motor operation so that the slow speed return to the selected position can occur as above described.

It will, of course, be understood that if the turret motor was initially energized to operate the turret counterclockwise rather than clockwise, the control would have resided in the relay 184 instead of relay 144. Relay 184 has contacts 184A and 184B similar to those of relay 144.

I claim:

1. In a machine tool having a spindle, and bearing means for supporting the spindle for rotation and for axial movement the combination with a turret independent of said bearing means and having a plurality of chuck-storage pockets, of means for rotating the turret to present a selected pocket in registry with the spindle, a chuck releasably stored on the turret in the selected pocket, means for clutching the spindle to a chuck registering therewith while the chuck is still stored on the turret, and means for thereafter advancing the spindle through the turret and for carrying the chuck from said turret in the course of such advance.

2. In a machine tool provided with a spindle, the combination with a turret provided with a plurality of tool chuck pockets and mounted for rotation to register a preselected pocket with the spindle, tool chucks detachably mounted in the respective pockets, bearing means for mounting the spindle for rotation on a fixed axis and for axial advance through a pre-selected turret pocket which registers therewith normally disengaged clutch elements on the spindle and the respective chucks, means for rotating the turret to register a particular chuck with the spindle, means for advancing the spindle to engage its clutch element with that of the chuck, means for locking said clutch elements in connection while the tool chuck is still mounted on the turret, means for thereafter continuing the advance of the spindle to displace the chuck from the turret pocket, and means for rotating the spindle to rotate the chuck in its advanced position.

3. In a machine tool, the combination with a quill and a spindle rotatably mounted therein, of a spindle drive shaft and a quill feed shaft located beside the quill, a cross head connected with the quill and guided on said shafts and provided with a feed nut in threaded engagement with the feed shaft for quill advance and retraction, a spindle gear on the spindle, a driving gear splined to the spindle drive shaft and meshing with the spindle gear, a clutch member mounted on the spindle and provided with coupling jaws, a coupling jaw control rod reciprocable longitudinally of the spindle and connected with said jaws for the operation thereof, means for biasing said control rod in a direction to actuate said jaws, and yieldable means in the path of said rod in its movement with said quill for overcoming said bias, whereby to force said rod to release said jaws.

4. The combination of claim 3 in which said yielding means comprises a fluid operated piston having cylinder and fluid pressure connections, said piston being adapted to follow said rod to maintain thrust thereon to overcome bias of said spring means during quill advance, means for limiting the movement of the piston in the direction of quill advance whereby continued quill advance releases said rod from piston pressure, the piston being yieldable against the fluid pressure in said cylinder when reengaged by said rod in the retractive movement of the quill.

5. The device of claim 4 in further combination with a tool chuck having clutch means complementary to the clutch member of the spindle and having a stud provided with a head with which said jaws are engageable when actuated by the rod in the direction in which said rod is subject to bias.

6. The device of claim 5 in which the clutch member of the spindle comprises a head having a tapered socket and the clutch means of the chuck has a complementary taper.

7. The device of claim 3 in further combination with a turret having detent elements yieldable in a generally radial direction from said pocket and the tool chuck having a beveled surface engageable with said detent means to force the detent means aside in the movement of the chuck respecting the turret, the detent means normally positioning the chuck in the turret pocket subject to accommodating movement of the chuck under thrust sufficient to force the detent means aside.

8. A machine tool comprising the combination with a frame having a worktable, of a plurality of columns mounted on the frame, a head spanning the columns, a spindle having means for its operative rotation and support from said head, the spindle being disposed above the table and offset from one of said columns, means for presenting a selected tool in registry with the spindle to be operated thereby, said means including a turret rotatably mounted on said one of said columns for movement in a path transverse respecting the spindle, the spindle having a fixed axis of rotation and the turret being provided with circumferentially spaced tool pockets, and means for rotating the turret for registering a selected tool pocket with said spindle, means for axially advancing the spindle to engage and advance a selected tool in registry therewith, means controlled as to operation by tool resistance for clutching a selected tool to the spindle in the course of spindle advance, and impositive detent means for holding the respective tools on the turret and for providing said tool resistance to effect clutching of the tool to the spindle before releasing a selected tool for advance with the spindle when engaged thereby.

9. A machine tool according to claim 8 in which tool chucks are mounted in the respective pockets of the turret to be registered with the spindle by turret rotation, each chuck having a clutch element for which the spindle has a complementary clutch element, tools mounted in the chucks, means for advancing the spindle to engage its clutch element with that of the chuck registering therewith, and means operative in the course of continued spindle advance for coupling the clutch elements of the chuck and spindle while the chuck is still held by the turret, the spindle displacing the coupled chuck from the turret and advancing through the pocket of the turret to engage with work on the table the tool with which the chuck is provided.

10. In a machine tool, the combination with a quill provided with spindle bearings, a spindle rotatably mounted in said bearings for rotation on a fixed axis, means for advancing and retracting the quill longitudinally of said axis, a tool carriage movable transversely of said axis and provided with a plurality of openings selectively registrable with said spindle in selected positions of said carriage, means for advancing the quill along said axis to propel the spindle through a selected opening registering therewith, tools having carriers disposed in the respective openings, said carriage having impositive detent means for supporting the respective carriers in the respective openings subject to displacement by said spindle and coupling means operated by relative movement between the spindle and carrier for which operation the resistance of the carrier is responsible and including parts carried by the spindle and by the respective carriers for releasably coupling to the spindle a carrier engaged thereby, said detent means providing sufficient resistance to said carrier for the actuation of said coupling means before said carrier is released from said carriage whereby such carrier and its tool will be advanced with the spindle as the spindle moves through the selected opening of the carriage and will be retracted to re-engage said detent means when said spindle is retracted from said opening, and means for releasing the coupling means between the spindle and carrier as the spindle is retracted to a position such that the carrier is re-engaged by said detent means.

11. In a machine tool, the combination with a spindle, and bearing means for supporting the spindle for axial and reciprocative movement upon a fixed axis, of a tool chuck having a tool mounted therein, support means movable transversely of said axis for mounting said chuck, means for actuating the support means to move said chuck into registry with said axis, means on said support means for releasably holding a chuck so mounted against displacement along said axis, the spindle and chuck having complementary head and socket means, and means for connecting the chuck-mounted tool to the spindle for movement therewith prior to release of said holding means.

12. In a machine tool, the combination with a spindle, and bearing means for supporting the spindle for rotative movement and axial advance and retractive movement, and means for advancing the spindle axially for a predetermined stroke, of a plurality of tool chucks having tools mounted therein, support means for the several tool chucks and mounted tools, means for guiding the support means for movement transversely of the spindle axis for registering a selective chuck and tool with the spindle, said support means being disposed at a point intermediate the axial stroke of the spindle, yieldable means on the support means for releasably holding a chuck to the support means and for resisting the axial movement of the chuck beyond the support means in the continued advance of the spindle, and means operated by spindle advance and the resistance of said yieldable means and including complementary head and socket means on the spindle and chuck for connecting the chuck-mounted tool to the spindle for movement with the spindle during continued axial movement thereof and rotation thereof, said connecting means being operable prior to the release of said yieldable holding means, whereby the connection is effected while the chuck and tool are still held to the support means.

13. A combination according to claim 12 in which said complementary head and socket means includes actuating means whereby it is automatically releasable to disengage the spindle from the chuck upon re-engagement of the chuck with the yieldable means on the support means in the course of retraction of the spindle.

14. In a machine tool, the combination with a rotatable spindle, and bearing means for supporting the spindle for rotation and for axial advancing and retracting movement on a fixed axis, of a carriage movable transversely of said axis and having a plurality of openings selectively registerable with said axis, a yieldable detent mounted on the carriage adjacent each such opening, tool carriers releasably fixed on the carriage in registry with respective openings and releasably held to the carriage by respective yieldable detents aforesaid, means for actuating the carriage to register a selected tool carrier with the spindle axis, tools on respective carriers, means for advancing the spindle through a carriage opening registering therewith and for retracting the spindle from such opening, automatic coupling means carried by the spindle and by the carrier for connecting such a carrier with the spindle while the carrier is still fixed on the carriage, the release of said detent thereupon permitting the last said carrier and the tool thereon to advance with the spindle and to rotate therewith.

15. A combination according to claim 14 in which said detent means constitutes means for effecting release of said coupling means upon the retractive movement of said spindle and to effect re-engagement of said carrier with said detent means, whereby said carrier is re-fixed on the carriage at the instant of release of said coupling and prior to continued retraction of said spindle.

References Cited by the Examiner
UNITED STATES PATENTS

| 2,363,208 | 11/44 | Sulzer | 29—26 |
| 2,860,547 | 11/58 | Stephan | 90—11.1 |
| 2,952,170 | 9/60 | Hansen | 29—26 |
| 3,074,147 | 1/63 | Miller | 29—26 |

FOREIGN PATENTS 1,236,668  6/60  France.

RICHARD H. EANES, JR., *Primary Examiner.*